United States Patent
Lee

(10) Patent No.: US 8,058,832 B2
(45) Date of Patent: Nov. 15, 2011

(54) MOTOR DRIVING CIRCUIT AND METHOD THEREOF

(75) Inventor: Ching-Tsan Lee, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 429 days.

(21) Appl. No.: 12/237,405

(22) Filed: Sep. 25, 2008

(65) Prior Publication Data

US 2009/0243529 A1 Oct. 1, 2009

(30) Foreign Application Priority Data

Mar. 31, 2008 (TW) .............................. 97111703 A

(51) Int. Cl.
*H02P 1/00* (2006.01)
(52) U.S. Cl. ......... 318/494; 318/291; 318/287; 318/280
(58) Field of Classification Search .................. 318/494, 318/293, 291, 287, 280
See application file for complete search history.

(56) References Cited

U.S. PATENT DOCUMENTS

| 5,550,446 | A | * | 8/1996 | Schlager et al. | ......... 318/400.19 |
| 5,661,383 | A | * | 8/1997 | Schlager et al. | ......... 318/400.19 |
| 5,923,133 | A | * | 7/1999 | Menegoli | ................. 318/400.19 |
| 5,939,909 | A | * | 8/1999 | Callahan, Jr. | ................. 327/108 |
| 6,072,289 | A | * | 6/2000 | Li | ............................ 318/400.19 |
| 6,084,378 | A | * | 7/2000 | Carobolante | ................. 318/811 |

* cited by examiner

*Primary Examiner* — Walter Benson
*Assistant Examiner* — David Luo
(74) *Attorney, Agent, or Firm* — Winston Hsu; Scott Margo

(57) ABSTRACT

A motor driving circuit includes a control device, a detection module and a driving module. The control device is controlled by a control signal and is coupled to a motor. The control device includes a first terminal, a second terminal and a control terminal, wherein a driving current flowing through the motor flows through the first terminal and the second terminal. The detection module is used for detecting a voltage of the first terminal. The driving module is used for generating the control signal to control the driving current, wherein the detection module adjusts the driving capability of the driving module, thereby adjusting a slew rate of the control signal.

18 Claims, 6 Drawing Sheets

MOTOR DRIVING CIRCUIT AND METHOD THEREOF

BACKGROUND OF THE INVENTION

1. Field of the Invention

The present invention relates to a motor driving circuit and a method thereof, and particularly relates to a motor driving circuit that can control a slew rate of a current flowing through a motor, and a method thereof.

2. Description of the Prior Art

FIG. 1 illustrates a prior art motor driving circuit 100. As shown in FIG. 1, the motor driving circuit 100 includes a control circuit 101, an H bridge circuit 103, an error amplifier 105, drivers 107 and 108, and a feedback resistor 109. The driving circuit 100 serves to control driving currents 11 and 12 flowing through the motor 111. The motor driving circuit 100 is configured to utilize a constant driving current, equal to voltage value of $V_{REF}$ divided by the resistance of the resistor 109, to drive the motor 111.

As shown in FIG. 1, the currents flowing through the motor 111 can have two paths, $I_1$ and $I_2$, to drive the motor 111 in two different rotation directions respectively. Since detailed operations of the motor driving circuit 100 are well known by persons skilled in the art, they are omitted for brevity here.

The motor 111 can be regarded as an inductance device plus a resistor, thus a voltage $V_M$ with a value $$V_M = L\frac{dI}{dt} + IR$$

is generated across the circuit, wherein I is the driving current flowing through the motor, and R and L are respectively the inductance and resistance of the motor. At the moment that the control device 121 is turned on to drive the motor 111, the motor 111 will suffer a largest voltage across the motor 111, such that the motor 111 will experience a driving current with a high slew rate. The output voltage $V_{out1}$ at one terminal of the motor and a feedback voltage $V_{FB}$ are very close to a ground level. As time goes by, the current $I_1$ flowing through the motor 111 gradually increases, and the current flowing through the control device 121 tends to the desired constant current accordingly. However, for some reasons, the current $I_1$ flowing the motor 111 may be higher than the current flowing through the control device 121, charging the parasitic capacitor located at the node connecting between the motor 111 and the control device 121, and causing the occurrence of high-frequency LC oscillation, such that the current $I_1$ flowing through the motor 111 vibrates but converges to the desired constant driving current value, as shown in FIG. 2. The oscillation indicates the instability of the motor speed, even if the current 11 eventually converges to the constant current value. Therefore, such an issue should be improved.

SUMMARY OF THE INVENTION

One embodiment of the present invention discloses a motor driving circuit including a control device, a detection module and a driving module. The control device is controlled by a control signal and is coupled to a motor. The control device includes a first terminal, a second terminal and a control terminal, wherein a driving current flowing through the motor flows through the first terminal and the second terminal. The detection module is used for detecting a voltage of the first terminal. The driving module is used for generating the control signal to control the driving current, wherein the detection module adjusts the driving capability of the driving module, thereby adjusting a slew rate of the control signal.

Another embodiment of the present invention discloses a driving method corresponding to the above-mentioned system. The driving method includes: providing a control device controlled by a control signal, wherein the control device is coupled to the motor and includes a first terminal, a second terminal and a control terminal, where the first terminal is coupled to the motor, and the control signal controls a driving current flowing through the motor, the first terminal and the second terminal; providing a driving capability to drive the control terminal; detecting the voltage of the first terminal to generate a detection result; and adjusting the driving capability according to the detection result, thereby adjusting a slew rate of the control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
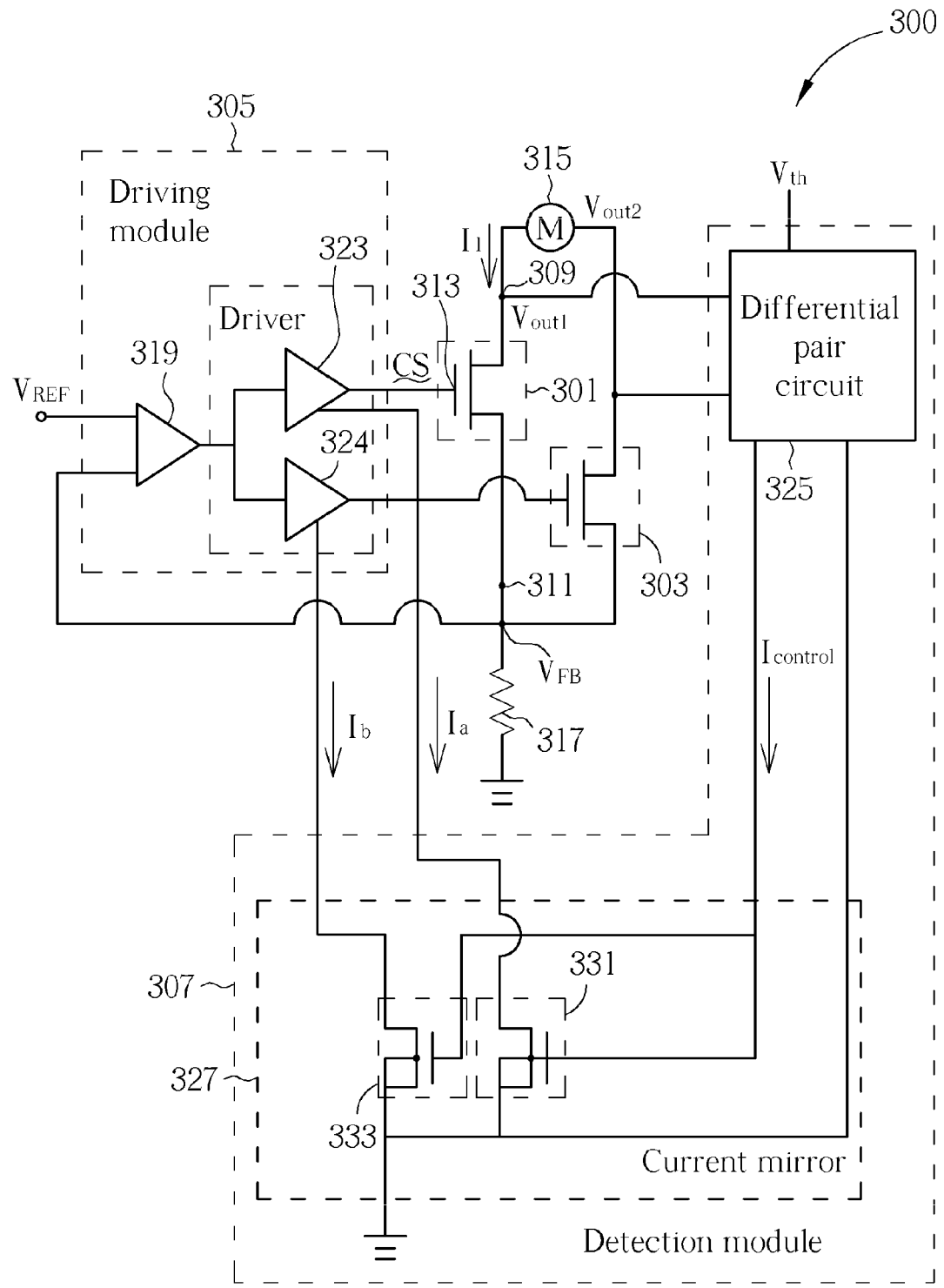
FIG. 3 is a motor driving circuit according to an embodiment of the present invention.

FIG. 3 is a motor driving circuit 300 according to an embodiment of the present invention. As shown in FIG. 3, the motor driving circuit 300 includes control devices 301 and 303, a driving module 305 and a detection module 307. It should be noted that, since the embodiment shown in FIG. 3 utilizes the H bridge circuit shown in FIG. 1 as a circuit for controlling motor rotation directions, it has two control devices 301 and 303. The present invention is not limited, however, to the case where there are two control devices, and one or more control devices can also be utilized for other embodiments. The scope of the present invention is defined by the claims rather than the embodiments shown in the specification.

The control device 301 is taken as an example in the following description, as the control device 303 also undergoes/performs the same operations. The control device 301, which can be a linear switch such as a MOS (metal oxide semiconductor) or a BJT (bipolar junction transistor), is controlled by a control signal CS and is coupled to a motor 315. The control device 301 includes a first terminal 309, a second terminal 311 and a control terminal 313, and is coupled to a feedback resistor 317. A driving current I1 flowing through the motor 315 flows through the first terminal 309 and the second terminal 311. The driving module 305 serves to generate the control signal CS for controlling the driving current $I_1$ according to a reference voltage $V_{REF}$ and a feedback voltage $V_{FB}$. The detection module 307 detects a voltage $V_{out1}$ of the first terminal 309, and adjusts the driving capability of the driving module 305 according to the voltage $V_{out1}$ to control a slew rate of the control signal CS. For example, when the voltage $V_{out1}$ meets a predetermined standard (in this case, the predetermined standard means lower than a reference voltage $V_{th}$), the output signal of the detection module 307 lowers the driving current of driving module 305 to decrease the slew rate of the control signal CS, thereby the slew rate of the driving current $I_1$ goes down.

In this embodiment, the driving module 305 includes an error amplifier 319 and drivers 323, 324. The error amplifier 319 compares the reference voltage $V_{REF}$ and the feedback voltage $V_{FB}$. The driver 323 outputs the control signal CS according to an output signal of the error amplifier 319. Driver 323 has a driving capability to drive control terminal 313, and the driving capability can be adjusted by the output of detection module 307, thereby adjusting the slew rate of the control signal CS.

The detection module 307 includes a comparator circuit, which is a differential pair circuit 325 in this embodiment. When a voltage of the first terminal 309 matches a predetermined standard, the output signal of the differential pair circuit 325 starts reducing the driving capability of the driving module 305, decreasing the slew rate of the control signal CS. In one embodiment, the differential pair circuit 325 outputs a current signal $I_{control}$, and the detection module 307 further includes a current mirror 327 for mirroring the current signal $I_{control}$ to generate currents $I_a$ and $I_b$. The current mirror 327 has two N type MOS circuits 331 and 333. In this embodiment, when the voltage $V_{out}$ is smaller than a reference voltage $V_{th}$, the differential pair circuit 325 increases the current signal $I_{control}$, thus the current $I_a$ increases accordingly. Current $I_a$ can be designed to deduct the driving current that driver 323 drives control terminal. For example, the actual driving capability of driver 323, the maximum current to pull up or down control signal CS, can be set as $I_{original}-I_a$, where $I_{original}$ is the originally—designed maximum driving current of driver 323. Thus, driver 323 decreases the slew rate of the control signal CS due to the increasing current $I_a$, and thereby the increasing speed of the driving current $I_1$ is reduced. Similarly, the current $I_b$ is raised correspondingly when the voltage $V_{out2}$ is smaller than the reference voltage $V_{th}$. The output signal of the detection module 307 according to the present embodiment is not limited to the current signals $I_a$ and $I_b$, and can be other signals such as a voltage signal.

Figure 1:
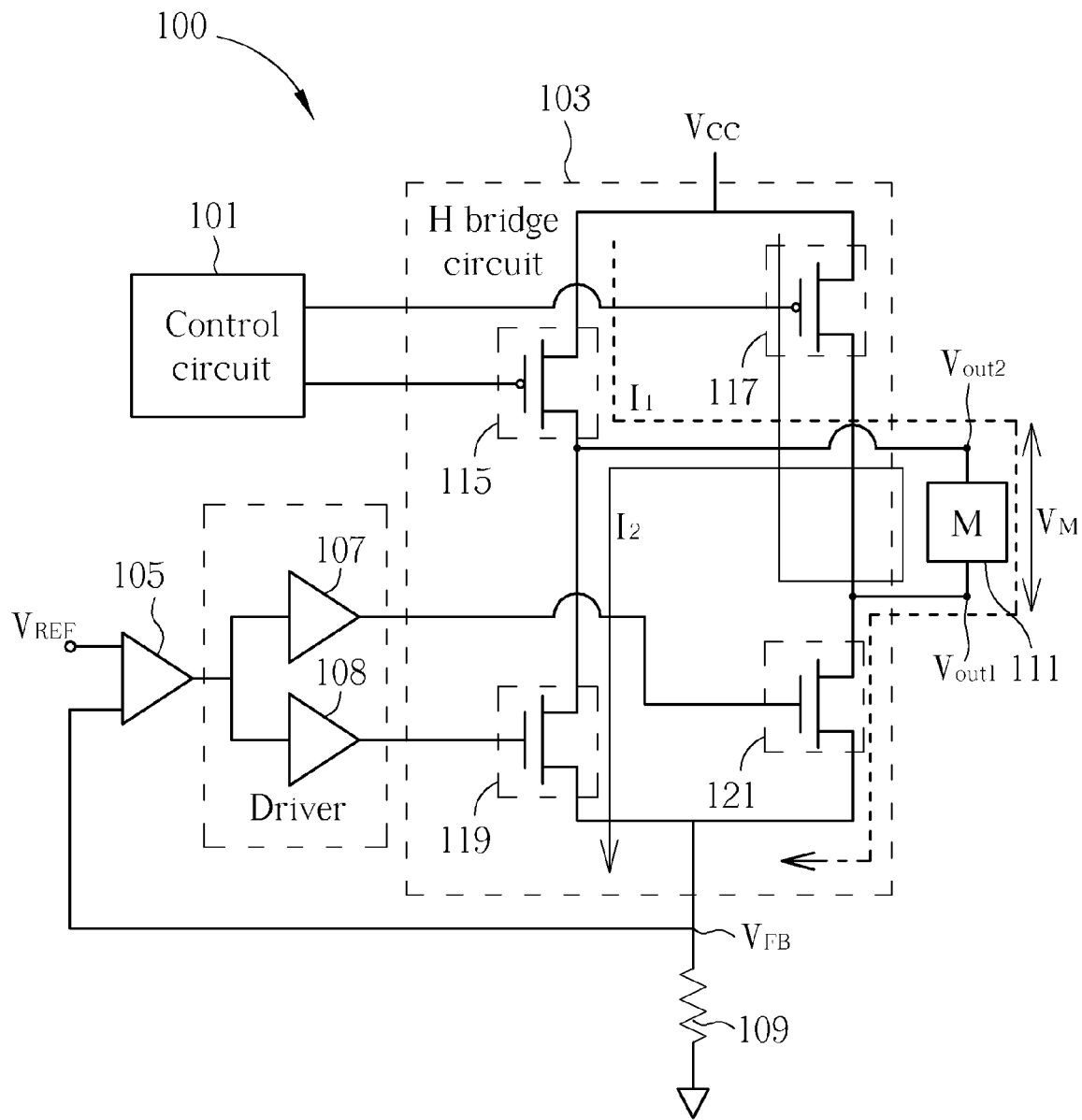
FIG. 1 illustrates a prior art motor driving circuit.
Figure 2:
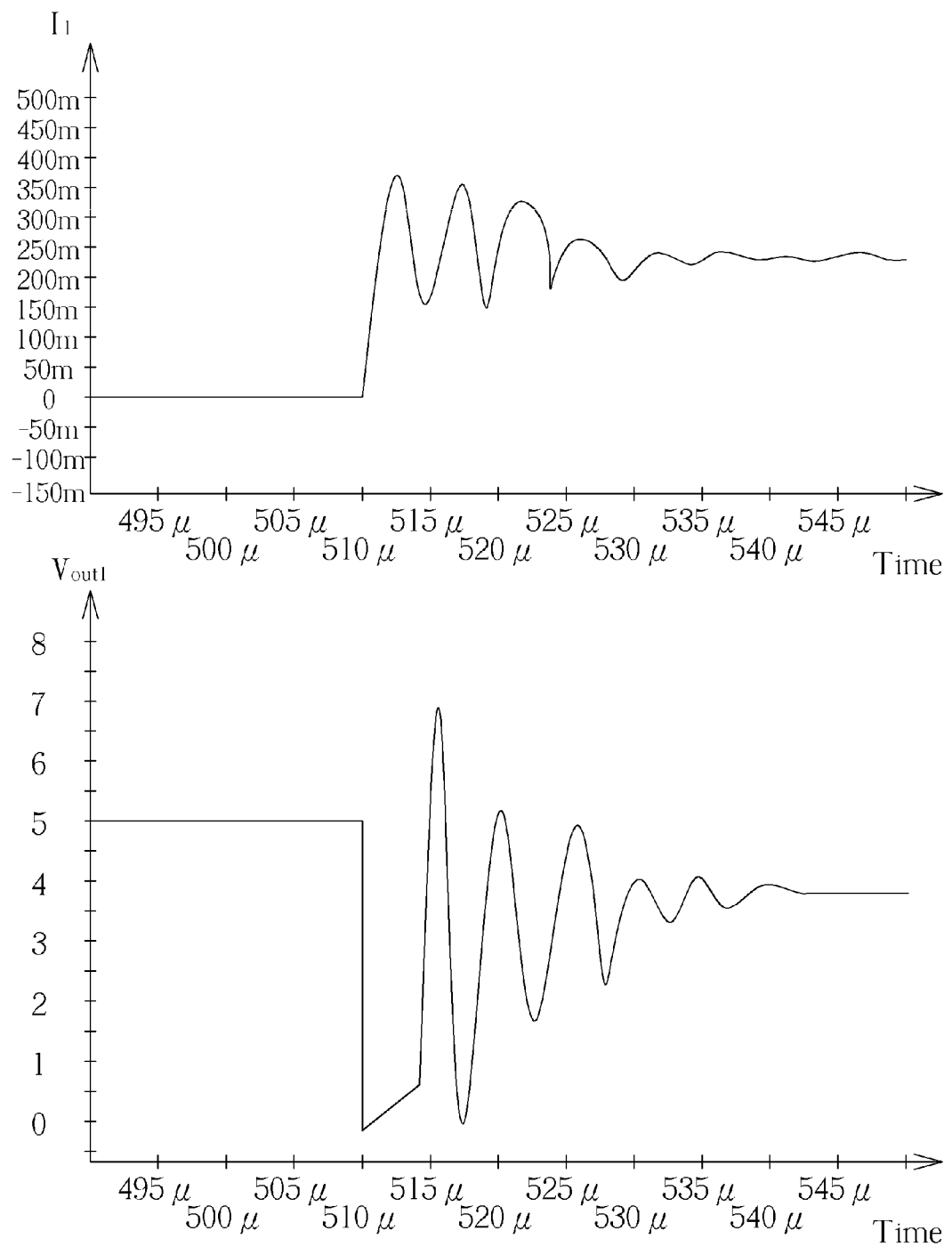
FIG. 2 illustrates voltage oscillation of the prior art motor driving circuit.

As described for FIG. 1, when the control device is just turned on, the driving voltage across the motor 115 has a maximum value, which most varies the current through motor 115. In this case, the voltage $V_{out1}$ is nearly ground, and the oscillation described in FIG. 2 occurs. However, via the structure shown in FIG. 3, when $V_{out1}$ is detected to be smaller than a predetermined value ($V_{th}$ in this embodiment), both the driving capability of driver 323 and the slew rate of control signal CS are reduced, meaning $V_{out1}$ has a reduced rate to approach ground, such that the variation rate for the driving current $I_1$ of the motor 315 decreases in compare with the result of FIG. 1. Therefore, the oscillation shown in FIG. 2 can be avoided.

Additionally, the types of motors that can be utilized include a bidirectional motor type and a multi-directional motor type. A bidirectional motor is taken as an example for the motor driving circuits shown in FIG. 1~FIG. 3, but this is not meant to limit the scope of the present invention. The motor driving circuits according to embodiments of the present invention can also be applied to a multi-directional motor.

Figure 4:
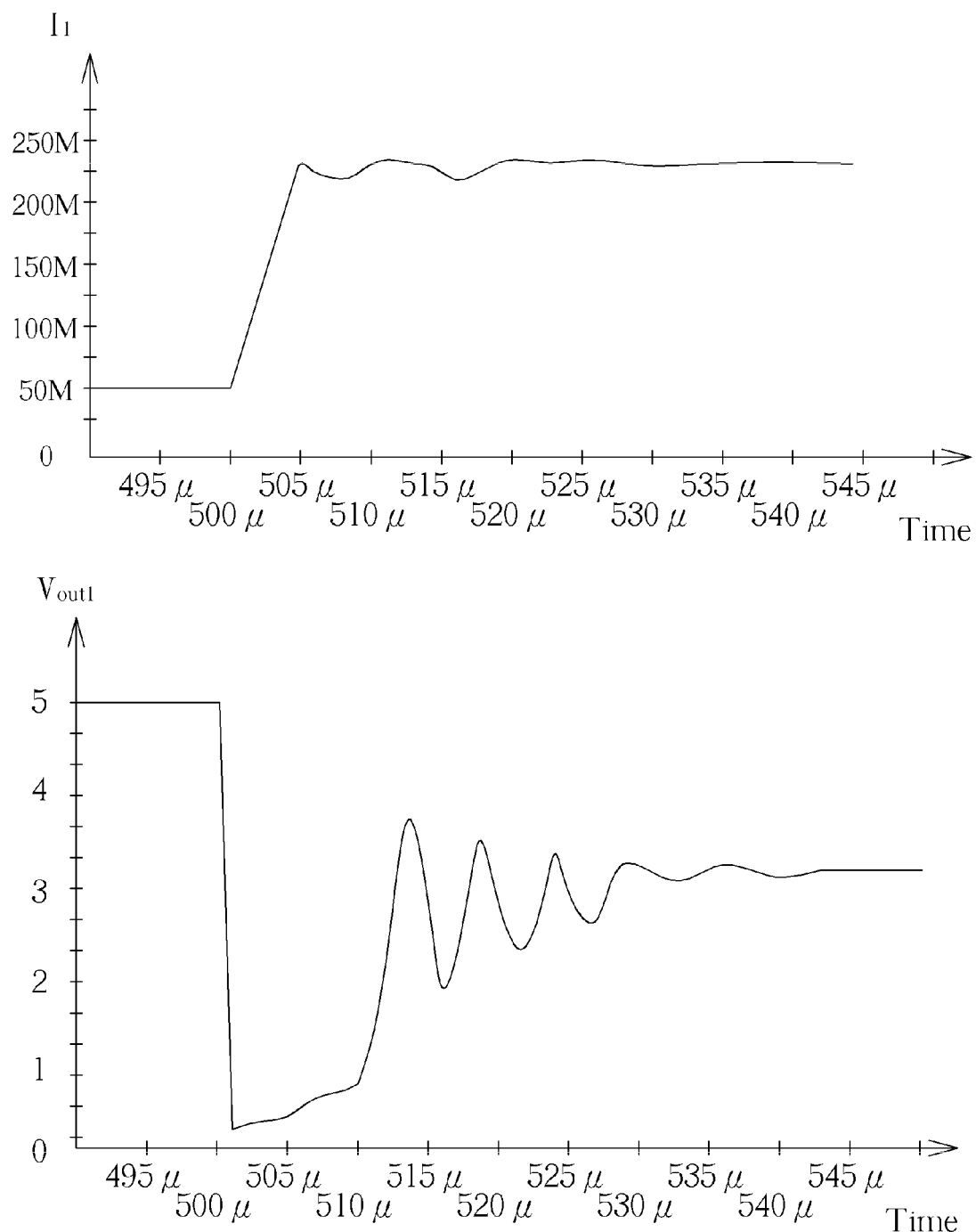
FIG. 4 is a schematic diagram illustrating the voltage-current relations of a motor driving circuit according to an embodiment of the present invention.

FIG. 4 is a schematic diagram illustrating the voltage-current relations of a motor driving circuit according to an embodiment of the present invention. Here, the driving current $I_1$ and the voltage $V_{out1}$ are taken as examples for description, and the driving current $I_2$ and the voltage $V_{out2}$ have the same relation. Compared with FIG. 2, the driving current $I_1$ shown in FIG. 4 is smoother and undergoes less swing. Furthermore, the voltage $V_{out1}$ correspondingly has a smaller variation, showing the oscillation in the prior art is avoided.

Figure 5:
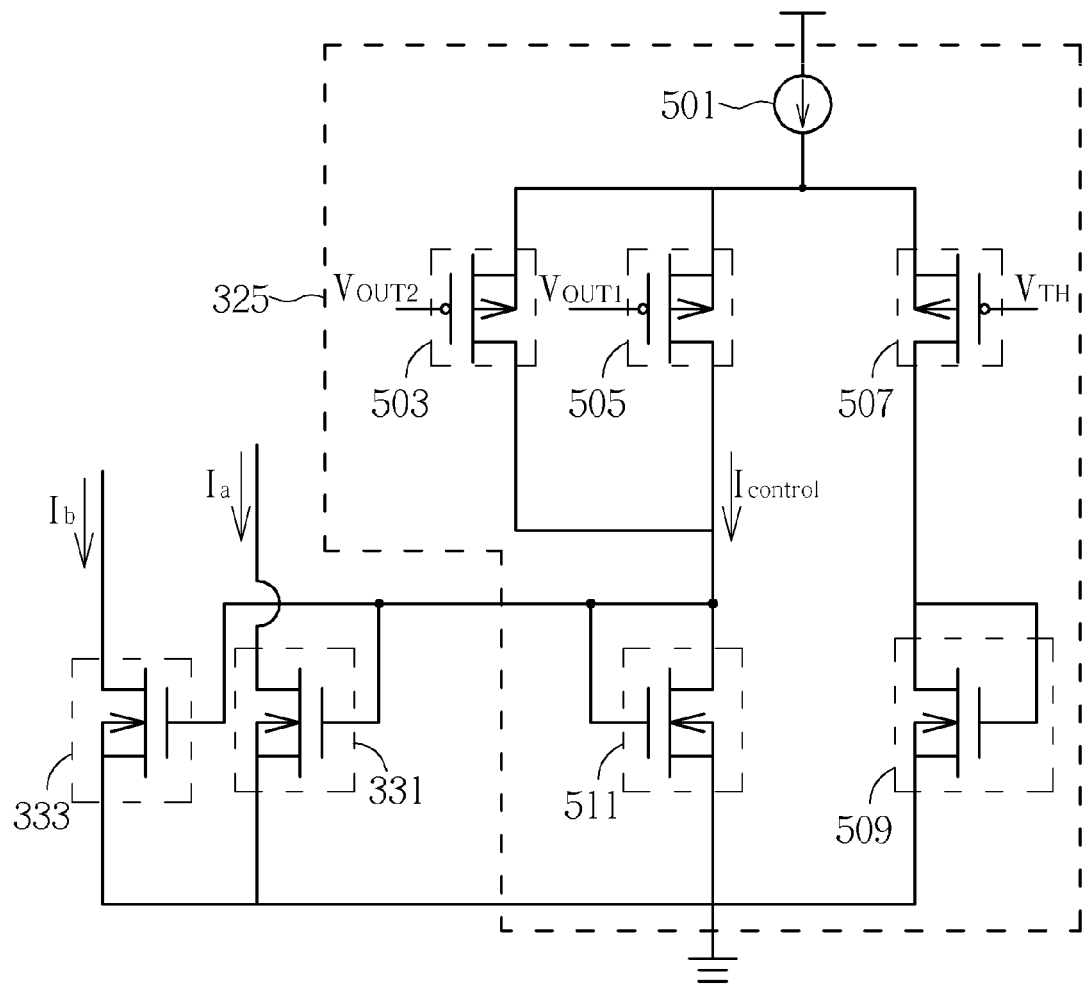
FIG. 5 is a differential pair circuit according to an embodiment of the present invention.

FIG. 5 is a differential pair circuit according to an embodiment of the present invention. As shown in FIG. 5, the differential pair circuit 325 includes a current source 501, P type MOS circuits 503, 505, 507 and N type MOS circuits 509 and 511. According to FIG. 5, the P type MOS circuits 503 or 505 can acquire more current from current source 501 when the voltage $V_{out1}$ or $V_{out2}$ is smaller than the reference voltage $V_{TH}$, thereby the current signal $I_{control}$ goes up and the currents $I_a$ and $I_b$ increase accordingly.

Figure 6:
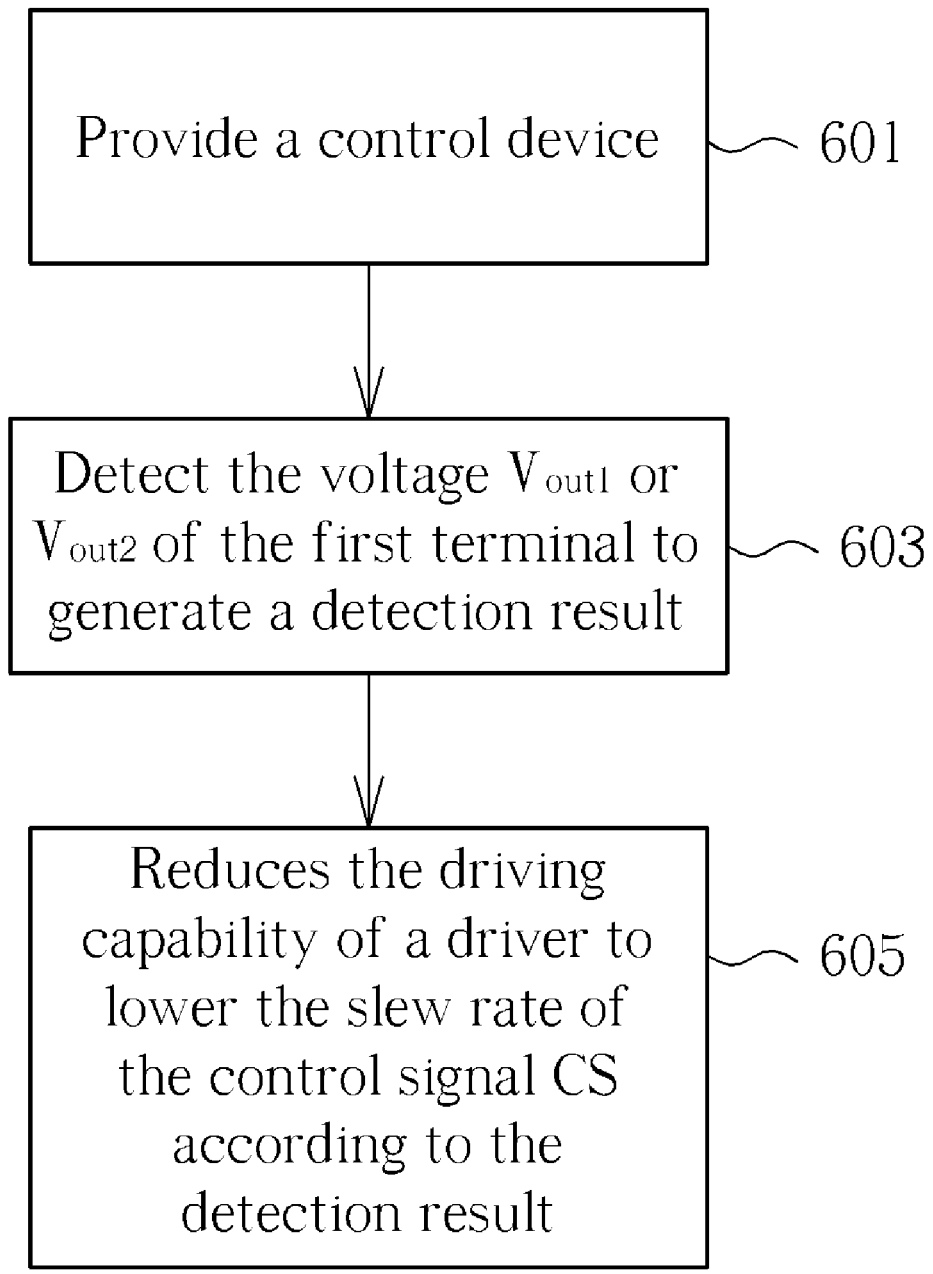
FIG. 6 illustrates a motor driving method according to an embodiment of the present invention.

FIG. 6 illustrates a motor driving method according to an embodiment of the present invention. Please jointly refer to FIGS. 3 and 6 to understand the concept of the present invention more clearly. The steps shown in FIG. 6 include:

Step 601

Provide a control device 301 or 303, controlled by a control signal CS. The control device 313 is coupled to a motor and includes a first terminal, a second terminal and a control terminal. A driving current ($I_1$ or $I_2$) flowing through the motor flows through the first terminal and the second terminal.

Step 603

Detect the voltage $V_{out1}$ or $V_{out2}$ of the first terminal to generate a detection result. In the embodiment shown in FIG. 3, a differential pair circuit 325 is utilized to generate a current signal $I_{control}$, and the mirrored currents $I_a$ and $I_b$ are utilized as the detection results.

Step 605

Lower the slew rate of the control signal CS according to the detection result, to control the driving currents $I_1$ or $I_2$.

In this embodiment, the currents $I_a$ and $I_b$ increase correspondingly when the voltage $V_{out}$ is smaller than a reference voltage $V_{th}$. That is, the step 603 determines whether the voltage $V_{out1}$ or $V_{out2}$ of the first terminal meets a predetermined standard or not to verify the detection result. Furthermore, the step 605 reduces the driving capability of a driver to lower the slew rate of the control signal CS when the voltage of the first terminal meets the predetermined standard, such that the slew rate of the driving currents $I_1$ or $I_2$ decreases.

The detailed characteristics of the driving method are well-known by persons skilled in the art, and are thus omitted here for brevity.

According to the above description, the rising up speed of the current can be reduced by reducing the slew rate of control signal CS when the voltage across a motor exceeds a predetermined value. The oscillation issue of the prior art can be avoided accordingly.

Those skilled in the art will readily observe that numerous modifications and alterations of the device and method may be made while retaining the teachings of the invention.

What is claimed is:

1. A motor driving circuit, comprising:
    a control device controlled by a control signal and coupled to a motor, including a first terminal, a second terminal and a control terminal, wherein a driving current flowing through the motor flows through the first terminal and the second terminal;
    a detection module, for detecting a voltage of the first terminal; and
    a driving module, for generating the control signal to control the driving current, wherein the detection module adjusts the driving capability of the driving module, thereby adjusting a slew rate of the control signal;
    wherein the detection module includes a differential pair circuit and current mirroring circuit to generate a first current control signal and a second current control signal to adjust the slew rate of the control signal and the driving capability of the driving module.

2. The motor driving circuit of claim 1, wherein the driving module comprises:
    an error amplifier, for comparing a reference voltage and a feedback voltage corresponding to the driving current; and
    a driver, for generating the control signal according to the output signal of the error amplifier, and the driving capability of the driver is controlled by the detection module.

3. The motor driving circuit of claim 1, wherein the motor is a bi-directional motor.

4. The motor driving circuit of claim 1, wherein the detection module adjusts the driving capability of the driving module when the voltage of the first terminal meets a predetermined standard.

5. The motor driving circuit of claim 4, wherein the detection module comprises a comparator circuit, for identifying whether the voltage of the first terminal meets the predetermined standard or not.

6. The motor driving circuit of claim 5, wherein the output signal of the comparator circuit is a current signal.

7. The motor driving circuit of claim 5, wherein the comparator circuit is a differential pair circuit.

8. The motor driving circuit of claim 5, wherein the detection module further includes a current mirror, for mirroring the output signal of the comparator circuit, where the output signal of the current mirror is utilized as the output signal of the detection module.

9. The motor driving circuit of claim 4, wherein the predetermined standard means that the voltage of the first terminal is smaller than a predetermined value.

10. A driving method for driving a motor, comprising:
    providing a control device controlled by a control signal, wherein the control device is coupled to the motor and includes a first terminal, a second terminal and a control terminal, where the first terminal is coupled to the motor, and the control signal controls a driving current flowing through the motor, the first terminal and the second terminal;
    providing a driving capability to drive the control terminal;
    detecting the voltage of the first terminal with a detection module to generate a detection result; and
    adjusting the driving capability according to the detection result, thereby adjusting a slew rate of the control signal;
    wherein the detection module includes a differential pair circuit and current mirroring circuit to generate a first current control signal and a second current control signal to adjust the slew rate of the control signal and to adjust the driving capability.

11. The driving method of claim 10, wherein the step of generating the detection result comprises identifying whether the voltage of the first terminal meets a predetermined standard to verify the detection result or not.

12. The driving method of claim 11, wherein the step of adjusting the driving capability includes adjusting the driving capability when the voltage of the first terminal meets the predetermined standard.

13. The driving method of claim 11, wherein the predetermined standard means that the voltage of the first terminal is smaller than a predetermined value.

14. The driving method of claim 10, being applied to a bi-directional motor.

15. The driving method of claim 10, wherein the step of detecting the voltage of the first terminal to generate the detection result utilizes a comparator circuit to output an output signal as the detection result.

16. The driving method of claim 15, wherein the output signal of the comparator circuit is a current signal.

17. The driving method of claim 15, wherein the comparator circuit is a differential pair circuit.

18. The driving method of claim 15, wherein the step of detecting the voltage of the first terminal to generate the detection result includes utilizing a current mirror, for mirroring the output signal of comparator circuit, where the output signal of the current mirror is utilized as the detection result.

* * * * *